United States Patent
Mora et al.

(10) Patent No.: US 9,569,508 B2
(45) Date of Patent: Feb. 14, 2017

(54) BUSINESS PROCESS VISUALIZATION (75) Inventors: Gary A. Mora, San Leandro, CA (US); Bhupinder Singh Sondhi, Fremont, CA (US); David J. Bell, Folsom, CA (US); Amira A. Morcos, San Ramon, CA (US); Carl Yerkovich, Berkeley, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 233 days.

(21) Appl. No.: 13/235,621

(22) Filed: Sep. 19, 2011

(65) Prior Publication Data

US 2012/0072415 A1 Mar. 22, 2012

Related U.S. Application Data (60) Provisional application No. 61/384,263, filed on Sep. 18, 2010.

(51) Int. Cl.
*G06F 17/30* (2006.01)
*G06Q 10/10* (2012.01)

(52) U.S. Cl.
CPC ......... *G06F 17/30554* (2013.01); *G06Q 10/10* (2013.01)

(58) Field of Classification Search
CPC .......................... G06F 17/30554; G06Q 10/10
USPC ........................................................ 707/608
See application file for complete search history.

(56) References Cited

U.S. PATENT DOCUMENTS

| | | | |
|---|---|---|---|
| 6,968,331 B2 | 11/2005 | Bar-Yossef et al. | |
| 7,945,850 B2 | 5/2011 | Machalek | |
| 8,046,273 B2* | 10/2011 | Welter | G06Q 10/087 705/26.8 |
| 2001/0028364 A1 | 10/2001 | Fredell | |
| 2002/0023122 A1* | 2/2002 | Polizzi | G06F 17/30873 709/202 |
| 2003/0140307 A1 | 7/2003 | Bar-Yossef et al. | |
| 2004/0199543 A1 | 10/2004 | Braud et al. | |
| 2004/0237038 A1* | 11/2004 | Stuhec | G06Q 10/10 715/234 |
| 2004/0252134 A1* | 12/2004 | Bhatt | G06F 17/30554 345/619 |
| 2005/0027574 A1 | 2/2005 | Agrawal et al. | |
| 2005/0177507 A1* | 8/2005 | Bandych et al. | 705/40 |
| 2006/0031849 A1 | 2/2006 | Barta et al. | |
| 2006/0184882 A1 | 8/2006 | Molander et al. | |
| 2006/0184883 A1 | 8/2006 | Jerrard-Dunne et al. | |

(Continued)

OTHER PUBLICATIONS

People Tools 8.51 PeopleBook: People Soft Query (Aug. 2010) pp. 1-188.

(Continued)

*Primary Examiner* — Albert Phillips, III
(74) *Attorney, Agent, or Firm* — Precision IP (57) ABSTRACT

A business process visualization is described. In one embodiment, process may include searching for documents stored in memory. The search identifies first documents, wherein the first documents comprise data of respective transactions of a first business process sequence implemented by an enterprise application. A user interface (UI) is then generated that includes components corresponding to the first documents, respectively, and components that visually identify relationships between the first documents.

20 Claims, 5 Drawing Sheets

(56) References Cited

U.S. PATENT DOCUMENTS

| | | |
|---|---|---|
| 2006/0195779 A1 | 8/2006 | McElroy et al. |
| 2006/0224951 A1 | 10/2006 | Burke et al. |
| 2006/0277089 A1 | 12/2006 | Hubbard et al. |
| 2007/0118446 A1* | 5/2007 | Soehngen ............ G06Q 10/087 705/34 |
| 2007/0162562 A1 | 7/2007 | Kwon et al. |
| 2007/0240063 A1 | 10/2007 | Cheng et al. |
| 2008/0040704 A1 | 2/2008 | Khodabandehloo et al. |
| 2008/0120129 A1* | 5/2008 | Seubert ................ G06Q 10/06 705/35 |
| 2008/0165133 A1 | 7/2008 | Blumenberg et al. |
| 2008/0229112 A1 | 9/2008 | Yamauchi et al. |
| 2008/0263216 A1 | 10/2008 | Jacob et al. |
| 2009/0063990 A1 | 3/2009 | Morris et al. |
| 2009/0070698 A1* | 3/2009 | Shurtleff ......... G06Q 10/06375 715/772 |
| 2009/0158190 A1 | 6/2009 | Higginson |
| 2009/0222720 A1 | 9/2009 | Drieschner |
| 2009/0254825 A1 | 10/2009 | Sichart et al. |
| 2010/0058438 A1* | 3/2010 | Rajaram ........................... 726/2 |
| 2010/0138734 A1 | 6/2010 | Braud et al. |
| 2010/0332360 A1* | 12/2010 | Nowotny ............... G06Q 10/10 705/30 |
| 2012/0005659 A1* | 1/2012 | Bonanno ............... G06F 11/362 717/129 |
| 2012/0323953 A1 | 12/2012 | Ortega et al. |
| 2013/0067115 A1 | 3/2013 | Lapanc |
| 2013/0117652 A1 | 5/2013 | Folsom |

OTHER PUBLICATIONS

People Tools 8.51 PeopleBook: People Tools Portal Technologies (Aug. 2010) pp. 1-3.

People Tools 8.51 PeopleBook: People Tools Portal Technologies (Aug. 2010) pp. 1-34.

* cited by examiner

BUSINESS PROCESS VISUALIZATION

CROSS-REFERENCE TO RELATED APPLICATIONS

This application claims the benefit of Provisional patent Application No. 61/384,263, filed on Sep. 18, 2010, and entitled, "Cross Product Workcenter and Process Visualization," naming Richa Dubey et al. as inventors. The above-referenced application is hereby incorporated by reference herein in its entirety.

BACKGROUND OF THE INVENTION

Enterprise applications can implement one or more business processes that assist with, for example, billing, payment processing, customer relationship management, resource planning, human resource management, etc.

Enterprise applications are typically hosted on one or more server computer systems (servers) and provide simultaneous services to a large number of users via client computer systems (clients). This is in contrast to a single-user application that is executed on a user's personal computer and serves only one user at a time.

SUMMARY

A business process visualization is described. In one embodiment, process may include searching for documents stored in memory. The search identifies first documents, wherein the first documents comprise data of respective transactions of a first business process sequence implemented by an enterprise application. A user interface (UI) is then generated that includes components corresponding to the first documents, respectively, and components that visually identify relationships between the first documents.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Enterprise applications implement well known business processes such as procure-to-pay or order-to-cash. A business process may consist of a sequence of transactions from beginning to end. Enterprise applications may create and store a document in memory for each transaction of the sequence. For example, a procure-to-pay business process may include a sequence of transactions that result in the creation of a requisition order, a purchase order, a receipt, a voucher, and a payment. Each document may store data relevant to its corresponding transaction.

In their day-to-day jobs, users of an enterprise application often review related documents. For purposes of explanation, two documents are related if they correspond to separate transactions of one business process sequence of transactions or they correspond to separate transactions of separate but related business process sequences of transactions. In one embodiment, separate transaction sequences can be related when they share a common transaction.

If a user seeks to review a particular document of interest, the user could navigate through a hierarchy of menus of the enterprise application to reach a user interface where information needed to identify the document is entered. Once the document identifying information is entered into the interface, the enterprise application can display the requested document on the user's client computer system. Menu navigation, unfortunately, can be time consuming and complex, particularly for those users who are not familiar with the enterprise application. Further, users wishing to see different types of documents may be required to menu navigate to distinct interfaces. For example, a user wishing to see a purchase order may be required to navigate to an interface through which purchase orders can be viewed; if the user then wishes to see a payment, the user may be required to undertake a different menu navigation to reach another interface through which payments can be viewed.

A business process visualization system is disclosed. Business process visualization enables users to more easily, effectively, and efficiently review documents that were created for business processes. For example, business process visualization may enable users to see visual relationships between documents for a business process sequence of transactions or documents for related business process sequences of transactions. Further aspects of business process visualization will be described below.

The present invention is described below in connection with several embodiments. However, the present invention is not intended to be limited to the specific forms set forth herein. References in the specification to "one embodiment" or "an embodiment" means that a particular feature, structure, or characteristic described in connection with the embodiment is included in at least one embodiment of the present invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
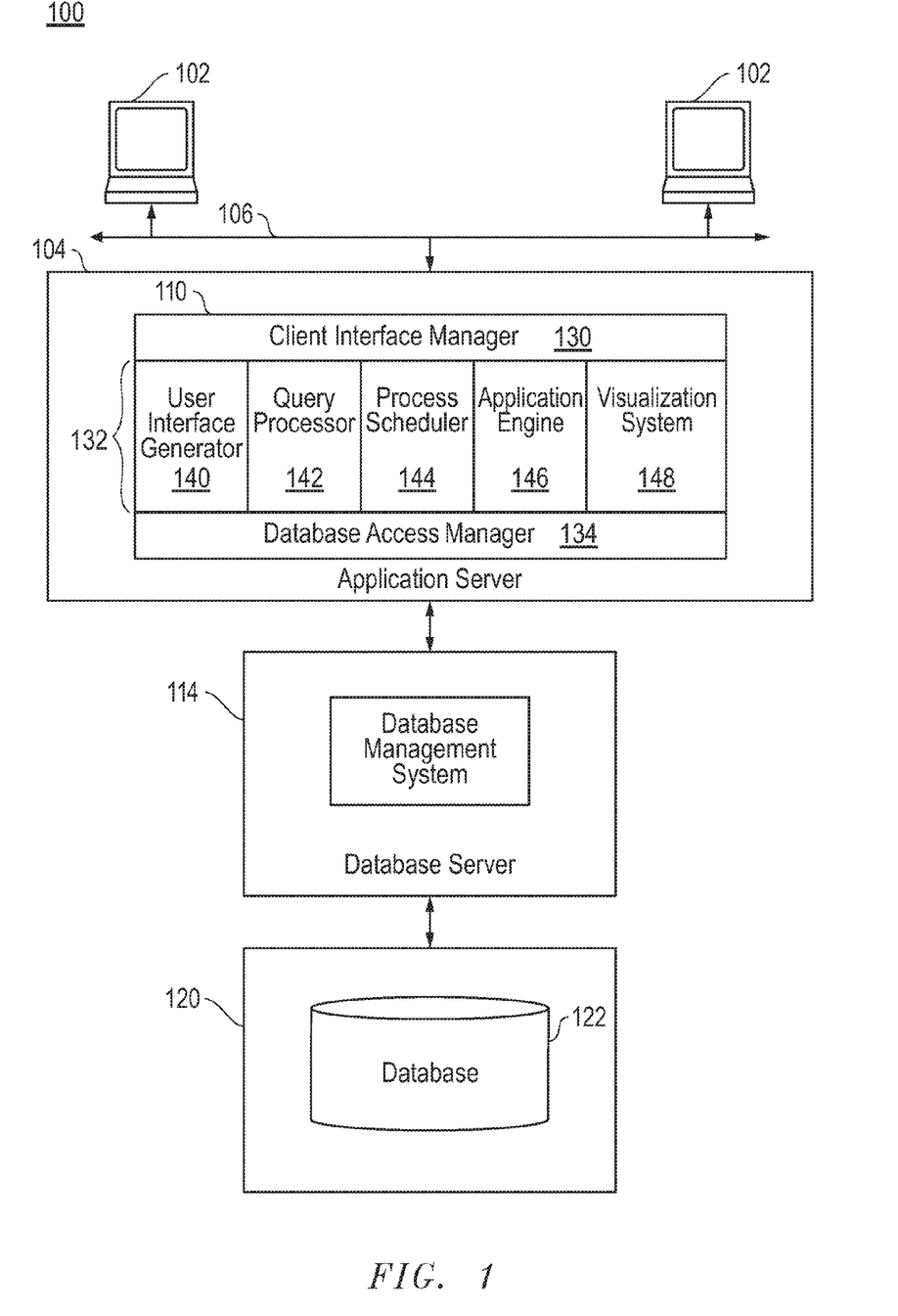
FIG. 1 graphically illustrates relevant components of an example system that employs one embodiment of the present invention.

FIG. 1 illustrates relevant components of a system 100 that includes client computer systems (clients) 102 in data communication with at least one application server 104 via network 106. Application server 104 includes an enterprise application system 110 that may take form in software instructions executing on one or more processors. The software instructions may be stored in one or more conventional computer readable mediums that may include, for example: magnetic storage media such as a magnetic disk (e.g., a disk drive); optical storage media such as an optical disk; solid state electronic storage devices such as random access memory (RAM), or read-only memory (ROM); or any other device or medium employed to store computer executable software instructions. Those skilled in the art will readily recognize that the enterprise application system 110 may be constructed in hardware or a combination of hardware and software.

Enterprise application system 110 is in data communication with database server 114, which in turn is in data communication with a storage area network (SAN) 120 that may take form in interconnected components such as storage devices (e.g., disk arrays), routers, switches, bridges, etc. SAN 120 may present several databases (e.g., relational databases) for access by software (e.g., a database management system) executing on database server 114. The present invention, however, will be described with reference to a single relational database 122, it being understood that the present invention should not be limited thereto.

On a conceptual level a relational database generally includes a collection of tables, each of which may contain one or more records or rows. Each record may have one or more fields that contain data. Tables can be related to allow data to be retrieved in a single query, although the data sought by the query may exist in more than one table. Data from multiple tables can be joined to form one large result set.

Enterprise application system 110 may generate SQL commands such as the select statement to retrieve data in response to user initiated requests to, for example, view a transactional document. SQL commands in turn are implemented by the database management system of database server 114 against database 122. Data returned by the database server 114 can be used to populate a user interface on a client 102 that presents, for example, a document for user review.

Enterprise application system 110 includes a client interface manager 130 that enables communication between clients 102 and core modules 132. Enterprise application system 110 also includes a data manager 134 that enables communication between a database management system of database server 114 and core modules 132. Core modules 132 of enterprise application system 110 provide diverse functions and may include an interface generator 140, an application engine 142, a workflow manager 144, a search engine 146, and a business process visualization system 148. Other core modules are contemplated.

In addition to communicating with the client interface manager 130 and data manager 134, core modules 132 are capable of communicating with each other. For example, application engine 142 may include a component that can create and/or finalize transactional documents (e.g., invoices) in accordance with information provided by the workflow manager 144. Search engine 146 may provide the results of a search to interface generator 140, which in turn generates a search results page for subsequent transfer and display on one of the clients 102 via client interface manager 130.

Workflow manager 144 can define and manage a sequence of transactions for a business process in order to produce a final outcome. Normally, one individual or group of individuals is responsible for finalizing a specific transaction (e.g., approving a purchase order) within the sequence. Once a transaction is complete, workflow manager 144 ensures that the individual(s) responsible for the next transaction of the sequence is notified and receives the data needed to execute the transaction. Workflow manager 144 may also automate redundant transactions and ensure uncompleted transactions are followed up. Workflow manager 144 may control automated business processes. If for example the above invoice document is finalized, but the workflow sequence requires a voucher to be generated, workflow manager would notify the individual responsible for voucher. A workflow manager reflects the dependencies required for the completion of each transaction of a sequence.

Users of enterprise applications frequently review documents. In order to quickly cross reference transactional documents of a business process sequence such as procure-to-pay, users may want to inquire on a document such as a purchase order, and determine other documents that are related by virtue of being associated with the same transaction sequence or related transaction sequences. In the case of a purchase order, this might include lines from multiple requisitions as well as receipts and vouchers which have been created from the purchase order. For example, the user may want to determine what requisitions ultimately resulted in a specific payment? What purchase orders, requisitions, payments and receipts are associated with a voucher? What purchase orders are tied to a receipt? Has a payment been made against this vendor invoice? How many receipts does this purchase order/requisition have?

Figure 2:
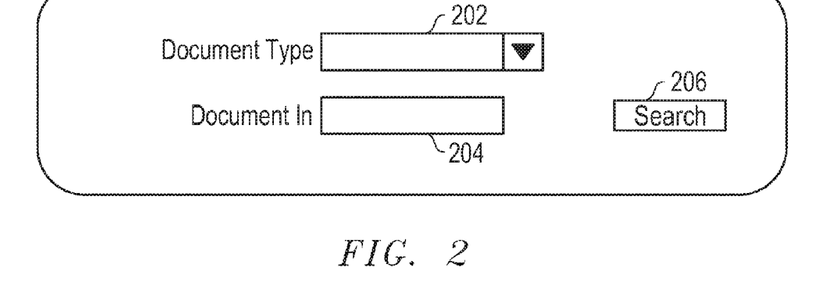
FIG. 2 graphically illustrates an example search page that can be employed in the system of FIG. 1.
Figure 3:
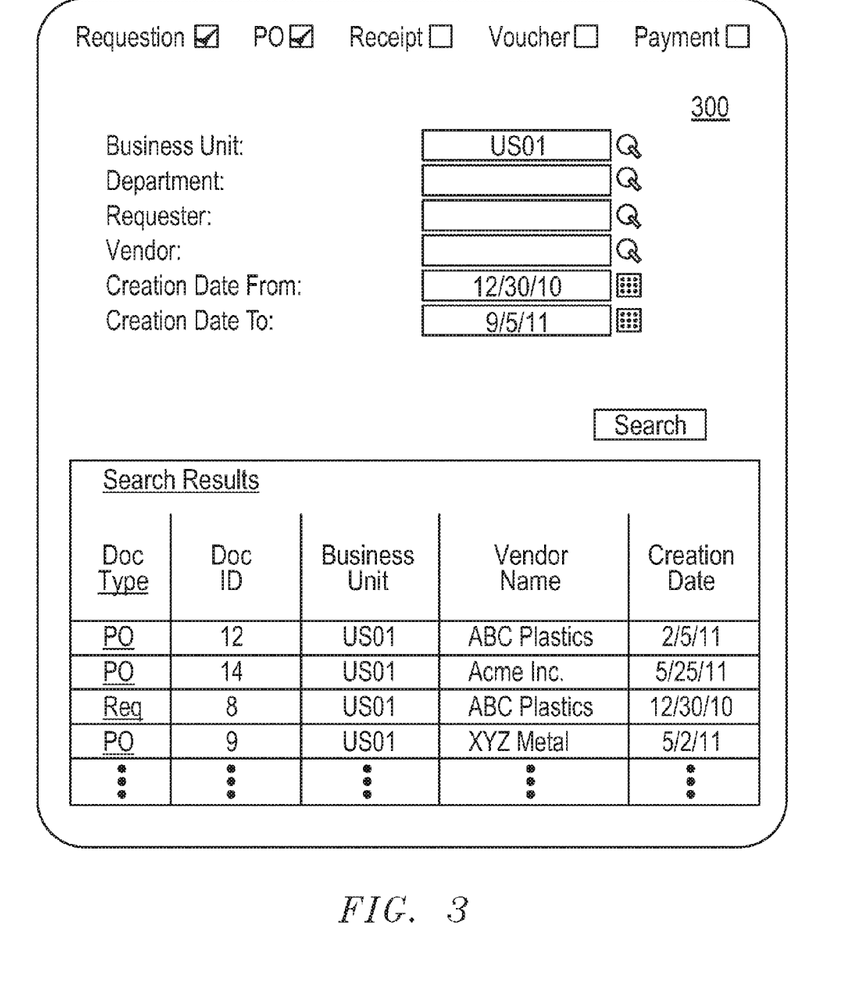
FIG. 3 graphically illustrates an example search page that can be employed in the system of FIG. 1.

A user can review transactional documents by menu navigating to one of two distinct search pages or interfaces that are shown in FIGS. 2 and 3, respectively. Each of these pages can be used to find a transactional document of interest (hereinafter referred to as the initial anchor document). In one embodiment, each document created by enterprise application system 110 comprises a unique identifier (ID) that includes a document type (e.g, purchase order, voucher, etc.) and number. The page shown within FIG. 2 can be used if user knows the type and number of the initial anchor document of interest. The search page shown in FIG. 3 can be used if the type and number of the initial anchor document is not known.

The search page in FIG. 2 includes at least two fields: a document type field and a document number field. A user can enter the document type within document type field 202 via a drop down menu that lists the available types. The user can then enter the document number within field 204. Once data has been entered into fields 202 and 204, the user can initiate a search of the existing transactional documents by activating button 206. In one embodiment, process visualization system 148 may also store the identifier (e.g., document type and number) of the initial anchor document in a family tree memory structure (not shown) once the identifier is entered and button 206 is activated. The initial anchor document is designated as such within the family tree memory structure.

With continuing reference to FIG. 1, the document type and number of the initial anchor document can be provided to document search engine 146, which in turn retrieves the corresponding initial anchor document (or data thereof) from data base 122. Data from the initial anchor document is subsequently provided to process visualization system 148, which in turn can use the data in cooperation with workflow manager 144 and search engine 146 to identify and retrieve related transactional documents. In one embodiment, a related document is one that was created for a transaction in a sequence that includes the transaction corresponding to the initial anchor document, or one that was created for a transaction in a sequence that shares a transaction with another sequence that includes the transaction corresponding to the initial anchor document.

Documents can be directly or indirectly related to the initial anchor document. A directly related document corresponds to a transaction of a sequence that immediately precedes or immediately follows the transaction for the initial anchor document, which is included in the same transaction sequence. There may be several transaction sequences that include the transaction corresponding to the initial anchor document. As a result, there may be more than one directly related document for a transaction that immediately precedes the transaction corresponding to the initial anchor document, and/or there may be more than one directly related document for a transaction that immediately follows the transaction corresponding to the initial anchor document.

Process visualization system 148 adds the identities (e.g., document type and number) in the document family memory structure of any directly related documents. Process visualization system 148 also stores transaction sequence relationship information (e.g., flow information) in the document family memory structure that identifies how directly related documents are related to the initial anchor document. Additional information may be stored for each identified, directly related document.

After process visualization system 148 identifies the directly related documents, process visualization system 148 may proceed with identifying documents indirectly related to the initial anchor document. In one embodiment, the indirectly related documents can be identified in a manner similar to process described above for identifying documents directly related to the initial anchor document. More particularly, process visualization system 148 may sequentially designate each of the directly related documents identified in the document family memory structure as an anchor document. While a directly related document is designated as an anchor document, business process visualization system 148 may proceed with identifying all documents directly related thereto. The identities of each document directly related to the document designated as anchor at the time, is added to the family tree memory structure along with transactional relationship information, unless the family tree memory structure already contains the identity and relationship information.

Process visualization system 148 can use the identities of documents indirectly related to the initial anchor document to find further, indirectly related documents in a similar process. Eventually, all documents directly or indirectly related to the initial anchor document are identified in the family tree memory structure along with information about their direct or indirect transaction relationships to the initial anchor document. Additional information about each document identified in the family tree memory structure may be added by business process visualization system 148.

Figure 4:
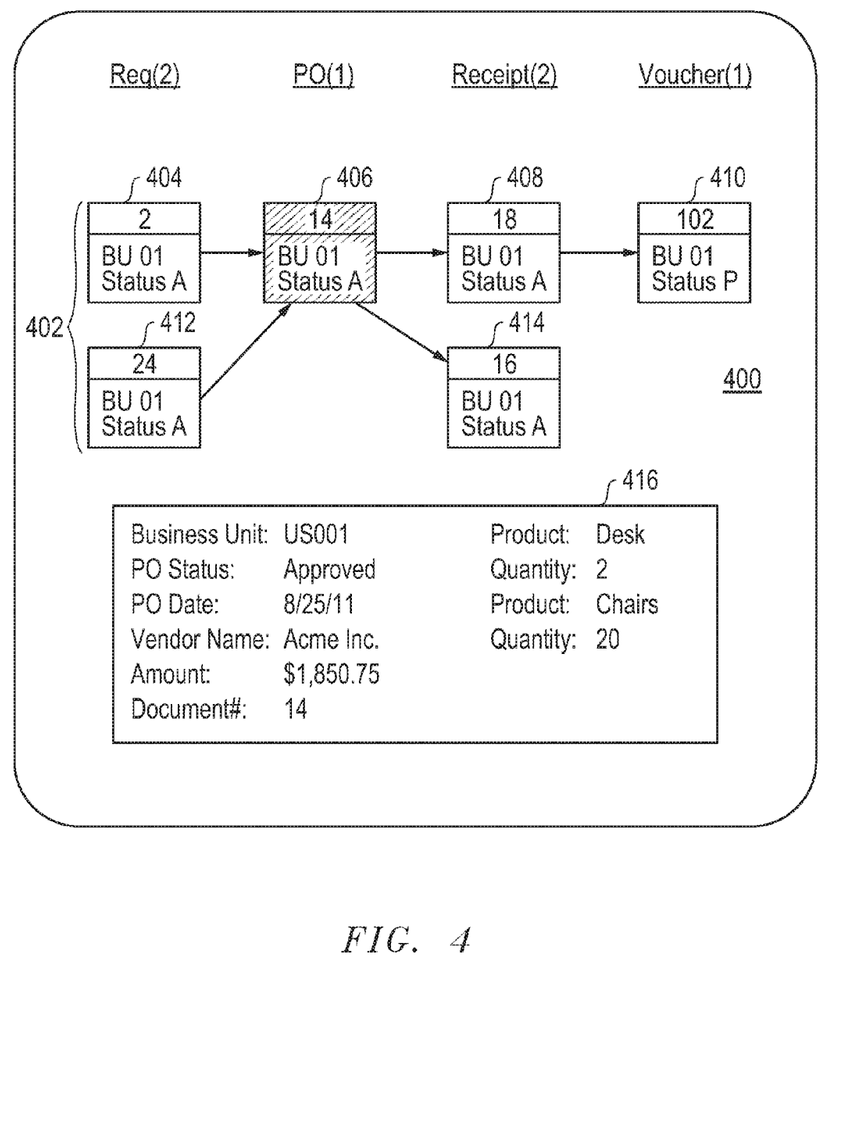
FIG. 4 graphically illustrates an example page, which includes a chart with several components representing several documents.

After process visualization system 148 populates the family tree memory structure with document identities and transactional relationship information, process visualization system 148 operating in conjunction with UI generator 140 uses the memory structure to create a process visualization page for display on client 102. This page may display visual representations of the initial anchor document and some or all of the directly or indirectly related documents identified in the memory structure along with visual representations of transactional relationships therebetween. FIG. 4 illustrates an example page 400, which includes a chart 402 with several components 404-414 representing several documents identified in a family tree memory structure, including the initial anchor document and several directly and indirectly related documents. Each of the components 404-414 identifies a respective document by document number, such as document number "102" in component 410. One component (e.g., component 406) represents the initial anchor document and is highlighted or otherwise visually presented as the initial anchor document in chart 402. Further, process visualization system 148 places components 404-414 underneath column headers that identify document types. Chart 402 also includes visual representations of the transactional relationships between documents represented by the components 404-414. Specifically, in this example, arrows extend from one component, representing a document corresponding to a transaction in a sequence, to another component representing another document corresponding to another transaction that immediately follows in the same sequence. Thus, the components 404 and 406 represent requisition 2 and purchase order 14, respectively, which correspond to directly related transactions in a sequence. FIG. 4 graphically illustrates examples of documents from four sequences of transactions. For example components 404, 406, 408, and 410 correspond to documents for respective transactions of one procure-to-pay business process sequence, while components 404, 406, and 414 correspond to documents for respective transactions of another sequence.

Each of the components shown within chart 402 also includes information regarding the status of its corresponding transaction/document. Statuses may include pending, approved, etc. In FIG. 4, the status of all the documents corresponding to components 404-414, except component 410, have been approved. Voucher 410 is shown as not been approved and such its status is listed as pending. However, once voucher 410 is approved, its status will change, and page 400 may be updated accordingly by process visualization system 148.

FIG. 4 also includes a panel 416 which displays information retrieved from one of the documents represented by components 404-414. When page 400 is first displayed, panel 416 presents information from the initial anchor document. Each of the components 404-414 within chart 416 includes an active link that, when activated, results in a generation of a request for select information of the corresponding document. When a user activates an active link of one of the components 404-414, panel 416 is refreshed with information from the document corresponding to the one component. Thus, when a user activates the active link of component 404, details of requisition "2" will be displayed in panel 416. However, even when contents of panel 416 are changed to display contents of another document, the anchor document remains visually designated as such in FIG. 4.

As can been seen within FIG. 4, the user can visually ascertain transactional relationships between documents of respective transaction sequences, including a first sequence that include requisition 2, purchase order 14, receipt 18 and voucher 102, and a second sequence that includes requisition 24, purchase order 14, and receipt 16. Purchase order 14 is a common document between the two example sequences. Using page 400, a user can easily ascertain that voucher 410 was generated in response to receipt 408, and probably includes common information.

Figure 5:
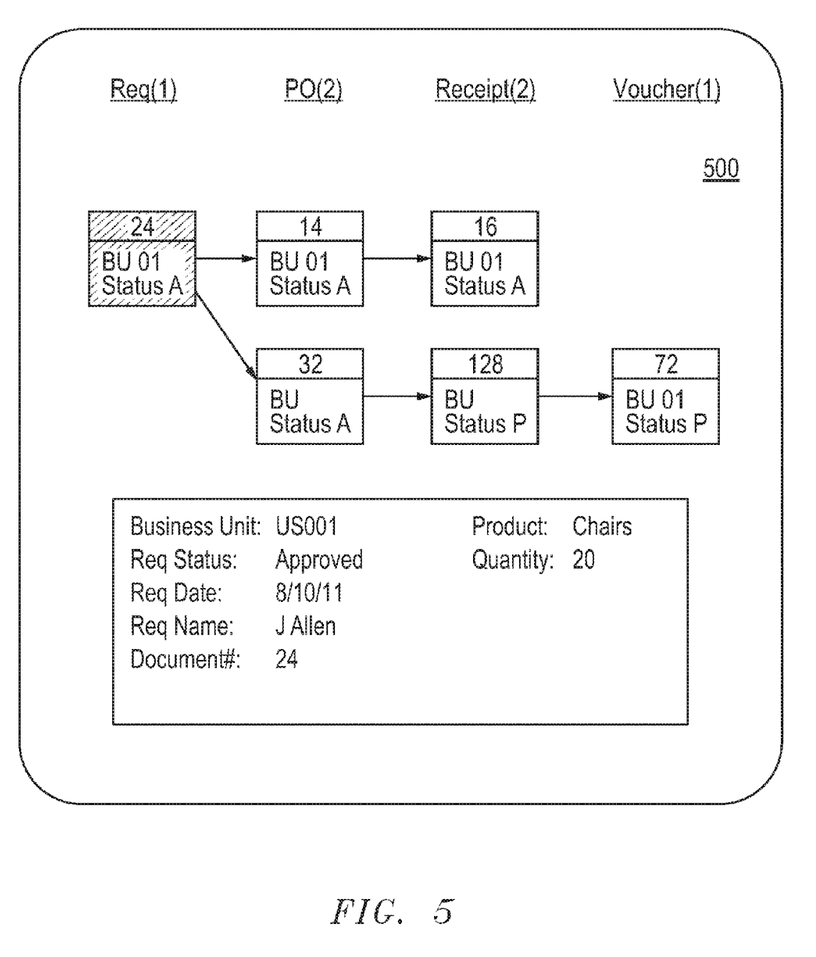
FIG. 5 graphically illustrates another example page, which includes a chart with several components representing several documents.

The initial anchor document can be changed by a user. To illustrate, the user can copy the document type and number from page 400 into the fields of the search page shown in FIG. 2, and activate the search button. In response, process visualization system 148 implements the process described above for identifying related documents, which results in the generation of a new page like that shown in FIG. 4. FIG. 5 illustrates page 500 generated in response to the user entering "requisition 24" into the appropriate fields of the interface in FIG. 2. Like the component relationship chart shown in FIG. 4, the component relationship chart in FIG. 5 illustrates transactional flow relationships between components that correspond to respective documents. Panel initially displays information of requisition 24, the initial anchor document in this example. Pages, like those shown in FIGS. 4 and 5, in another embodiment may only show those documents that are directly related to the initial anchor document (e.g., requisition 24 shown within FIG. 5).

The search page shown in FIG. 2 is useful if the document type and number are known. Oftentimes, however, a user may not know the document number and/or the document type. However, the user may have enough information about the document of interest such as vendor name, etc, that can be used in a document search. FIG. 3 shows an alternative search page that can be use when the document type and/or number is not known. The page shown in FIG. 3 provides fields into which document search criteria can be entered by the user. In the illustrated example, search page 300 includes various fields into which a user can enter criteria such as business unit, department, requestor, date range of creation, etc. Once data is entered into the fields, a search button is activated, which in turn sends the user's entered search criteria to document search engine 146 via client interface manager 130. Search engine 146 uses the criteria to generate queries which in turn retrieve the identities of one or more documents. The search page shown in FIG. 3 allows the user to restrict the search to particular document types. At the top of page 300, a user can identify which document types (e.g., requisition, purchase order, etc.) are to be searched by checking the appropriate boxes. The fields available into which criteria are entered may change depending upon the combination of document types that are selected by the user. If the search results identify a document of interest, it's document type and document number can be entered into the search page shown in FIG. 2.

Figure 6:
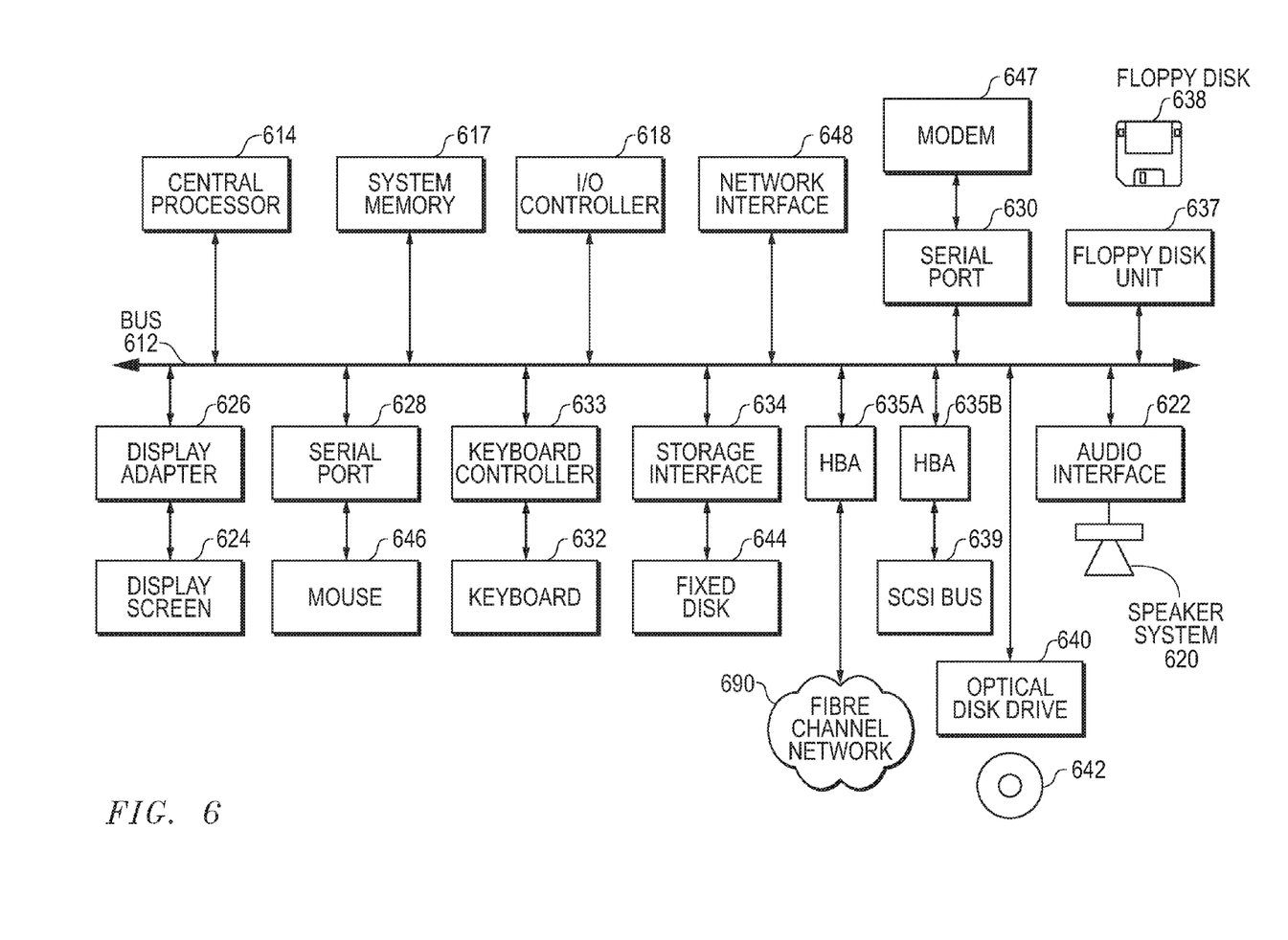
FIG. 6 is a block diagram of an example computer system that may be employed in the system of FIG. 1.

FIG. 6 depicts a block diagram of a computer system 610 suitable for implementing the present disclosure. Computer system 610 may be illustrative of various computer systems (e.g., server or clients) shown in FIG. 1. Computer system 610 includes a bus 612 which interconnects major subsystems of computer system 610, such as a central processor 614, a system memory 617 (typically RAM, but which may also include ROM, flash RAM, or the like), an input/output controller 618, an external audio device, such as a speaker system 620 via an audio output interface 622, an external device, such as a display screen 624 via display adapter 626, serial ports 628 and 630, a keyboard 632 (interfaced with a keyboard controller 633), a storage interface 634, a floppy disk drive 637 operative to receive a floppy disk 638, a host bus adapter (HBA) interface card 635A operative to connect with a Fibre Channel network 690, a host bus adapter (HBA) interface card 635B operative to connect to a SCSI bus 639, and an optical disk drive 640 operative to receive an optical disk 642. Also included are a mouse 646 (or other point-and-click device, coupled to bus 612 via serial port 628), a modem 647 (coupled to bus 612 via serial port 630), and a network interface 648 (coupled directly to bus 612).

Bus 612 allows data communication between central processor 614 and system memory 617, which may include read-only memory (ROM) or flash memory (neither shown), and random access memory (RAM) (not shown), as previously noted. The RAM is generally the main memory into which system 110, operating system, etc., is loaded. The ROM or flash memory can contain, among other code, the Basic Input-Output system (BIOS) which controls basic hardware operation such as the interaction with peripheral components. Applications resident with computer system 610 are generally stored on and accessed via a computer readable medium, such as a hard disk drive (e.g., fixed disk 644), an optical drive (e.g., optical drive 640), a floppy disk unit 637, or other storage medium. Additionally, applications can be in the form of electronic signals modulated in accordance with the application and data communication technology when accessed via network modem 647 or interface 648.

Storage interface 634, as with the other storage interfaces of computer system 610, can connect to a standard computer readable medium for storage and/or retrieval of information, such as a fixed disk drive 644. Fixed disk drive 644 may be a part of computer system 610 or may be separate and accessed through other interface systems. Modem 647 may provide a direct connection to a remote server via a telephone link or to the Internet via an internet service provider (ISP). Network interface 648 may provide a direct connection to a remote server via a direct network link to the Internet via a POP (point of presence). Network interface 648 may provide such connection using wireless techniques, including digital cellular telephone connection, Cellular Digital Packet Data (CDPD) connection, digital satellite data connection or the like.

The operation of a computer system such as that shown in FIG. 6 is readily known in the art and is not discussed in detail in this application. Code for implementing a CRM can be stored in computer-readable storage media such as one or more of system memory 617, fixed disk 644, optical disk 642, or floppy disk 638. Memory 620 is also used for storing temporary variables or other intermediate information during the execution of instructions by the processor 610. The operating system provided on computer system 610 may be MS-DOS®, MS-WINDOWS®, OS/2®, UNIX®, Linux®, or another known operating system.

Although the invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:
1. A method comprising:
receiving a request associated with a particular document identifying a particular transaction;
searching for one or more additional transactions in a same transaction sequence as the particular transaction;
identifying a set of documents respectively identifying the additional transactions, wherein at least one of the additional transactions is of a different type than the particular transaction;
generating a graphical user interface (GUI) comprising (a) components corresponding to the particular document and each of the set of documents related to the particular document, respectively, and (b) components that visually identify relationships between the particular document and one or more of the set of documents based on relationships between the particular transaction and each of the additional transactions;
wherein the method is performed by at least one device including a hardware processor.
2. The method of claim 1, wherein the GUI comprises a visual representation of at least a portion of data of the particular document.
3. The method of claim 1 wherein receiving the request comprises:

generating a field into which a document identification of the particular document is entered by a user.

4. The method of claim 1, wherein each of the components representing the set of documents, respectively, comprises a respective active link.

5. The method of claim 1, further comprising:
responsive to a user activating an active link corresponding to one of the set of documents;
refreshing the GUI to display at least a portion of data of the one of the set of documents.

6. The method of claim 1, wherein at least one of the components, that visually identifies a relationship between the particular document and one of the set of documents, comprises an arrow.

7. The method of claim 1, wherein the components, that visually identify relationships between the particular document and one or more of the set of documents related to the particular document, identify a sequence of transactions.

8. A non-transitory computer readable medium comprising instructions which, when executed by one or more hardware processors, causes performance of operations comprising:
receiving a request associated with a particular document identifying a particular transaction;
searching for one or more additional transactions in a same transaction sequence as the particular transaction;
identifying a set of documents respectively identifying the additional transactions, wherein at least one of the additional transactions is of a different type than the particular transaction;
generating a graphical user interface (GUI) comprising (a) components corresponding to the particular document and each of the set of documents related to the particular document, respectively, and (b) components that visually identify relationships between the particular document and one or more of the set of documents based on relationships between the particular transaction and each of the additional transactions.

9. The medium of claim 8, wherein the GUI comprises a visual representation of data of the particular document.

10. The medium of claim 8, wherein receiving the request comprises:
generating a field into which a document identification of the particular document is entered by a user.

11. The medium of claim 8, wherein each of the components representing the set of documents, respectively, comprises a respective active link.

12. The medium of claim 8, further comprising:
responsive to a user activating an active link corresponding to one of the set of documents;
refreshing the GUI to display at least a portion of data of the one of the set of documents.

13. The medium of claim 8, wherein at least one of the components, that visually identifies a relationship between the particular document and one of the set of documents, comprises an arrow.

14. The medium of claim 8, wherein the components, that visually identify relationships between the particular document and one or more of the set of documents related to the particular document, identify a sequence of transactions.

15. A system comprising:
at least one device including a hardware processor;
the system being configured to perform operations comprising:
receiving a request associated with a particular document identifying a particular transaction;
searching for one or more additional transactions in a same transaction sequence as the particular transaction;
identifying a set of documents respectively identifying the additional transactions, wherein at least one of the additional transactions is of a different type than the particular transaction;
generating a graphical user interface (GUI) comprising (a) components corresponding to the particular document and each of the set of documents related to the particular document, respectively, and (b) components that visually identify relationships between the particular document and one or more of the set of documents based on relationships between the particular transaction and each of the additional transactions.

16. The system of claim 15, wherein receiving the request comprises:
generating a field into which a document identification of the particular document is entered by a user.

17. The system of claim 15, wherein each of the components representing the set of documents, respectively, comprises a respective active link.

18. The system of claim 15, further comprising:
responsive to a user activating an active link corresponding to one of the set of documents;
refreshing the GUI to display at least a portion of data of the one of the set of documents.

19. The system of claim 15, wherein at least one of the components, that visually identifies a relationship between the particular document and one of the set of documents, comprises an arrow.

20. The system of claim 15, wherein the components, that visually identify relationships between the particular document and one or more of the set of documents related to the particular document, identify a sequence of transactions.

* * * * *